UNITED STATES PATENT OFFICE.

MAX FESSLER, OF PFORZHEIM, GERMANY.

PROCESS OF MAKING CHAINS.

1,175,941.          Specification of Letters Patent.     Patented Mar. 21, 1916.

No Drawing.      Application filed October 24, 1912. Serial No. 727,491.

*To all whom it may concern:*

Be it known that I, MAX FESSLER, a subject of the Emperor of Germany, residing at Pforzheim, in the Grand Duchy of Baden, Germany, have invented certain new and useful Improvements in Processes of Making Chains, of which the following is a specification.

This invention relates to a process of manufacturing chains made of links each composed of solder cored wire and its novelty consists in the several successive steps of the process employed to secure the desired result.

In Letters Patent of the United States No. 890,896 issued to Max Fessler of Pforzheim, Germany, there is described a process of continuously shutting the joints of the links of a chain of solder cored wire which consists in wetting the links with a soldering fluid, evaporating the adhering moisture, removing the soldering salt crystals from the parts other than the faces of the joints, passing the chain through a protective mass, and heating the chain until the core melts and shuts the joints. This invention may be considered as an improvement upon the process described and claimed in that patent.

In carrying out the invention, the chain is first formed in a chain-machine or otherwise in the usual manner. As this method of manufacture necessarily brings it in contact with more or less greasy materials, it must usually be cleansed by the removal of said material prior to subjecting it to the next steps of the process. This is commonly done by soaking the chain for a suitable length of time in a liquid in which the grease and oil is readily soluble, for example, one of the petroleum distillates like benzin or naphtha. It may and sometimes does occur, however, that the chain is sufficiently clean without this preliminary treatment. If there is any doubt on the subject, however, it should be subjected to such a cleansing operation. After being so cleansed, the chain is subjected to the action of a suitable fluxing material or soldering salt, preferably borax in solution in water. A portion of the solution adheres to the chain and coats it with such a quantity that when the solvent is removed, as will presently be described, a mass of the soldering salt crystals or flux crystals is left upon the links. To accomplish this result, the solution of the soldering salt should be a strong one and preferably a saturated one. After the links have been subjected to the action of the soldering salt in solution, the solvent should be removed. This is preferably accomplished by subjecting the chain to the action of heat and in experience I have found it advisable to tumble it at the same time so that a portion of the soldering salt may be removed from those parts of the links away from the faces of the joints. However, this tumbling operation is not necessary at this stage because such excess of the solder flux will be removed at the next successive step of the operation, and all that is really necessary to be accomplished at this point is the removal of the solvent. After the solvent has been removed from the links of the chain, the latter is then shaken up or violently agitated in contact with a mass of protective material, preferably powdered graphite, by means of which the soldering salt is completely removed from the surface of the chain links except at the faces where the joints are to be formed, and simultaneously the surface of the chain links are coated with a fine and substantially continuous coating of the powdered graphite sufficient to protect it against the heat to which it is to be thereafter subjected, and to prevent the adhering of the solder thereto. Any form of suitable device may be used to produce the conditions of agitation required, but it has been found that a closed receptacle provided with means whereby it may be shaken violently and continuously is to be preferred. After the chain has been coated with the protective material of graphite, it is then passed through the flame of a burner or soldering furnace in order that the solder may be heated to such a point that it will melt and by such melting will shut the joints of the chain.

What I claim as new is:

The process of treating the concatenated links of a chain of solder cored wire which consists of: first, soaking the same in a saturated solution of a soldering salt, second, removing the solvent, third, subjecting the same to the action of a powdered mass of protective material under conditions of agitation whereby simultaneously the deposited soldering salt is removed from the surface of the links and not at the joints, and the links are coated with a fine coating of the protective mass, and fourth, passing the links through a heating zone to melt the solder at the joints.

In testimony whereof I affix my signature in presence of two witnesses.

MAX FESSLER.

Witnesses:
 JOSEPH HEIFFER,
 ADOLF RAPP.